United States Patent
Naarup et al.

[15] 3,681,948
[45] Aug. 8, 1972

[54] METHOD AND APPARATUS FOR DEFATTING PELTS

[72] Inventors: Wayne D. Naarup, Salisbury, Md.; Martin E. Turner, Berlin, Md. 21811

[73] Assignee: Regal Farms, Inc., Berlin, Md.

[22] Filed: Oct. 22, 1970

[21] Appl. No.: 82,909

[52] U.S. Cl. ............................................. 69/22, 69/1
[51] Int. Cl. ............................................... C14b 1/00
[58] Field of Search ......... 69/22, 23, 1, 41, 42; 17/43

[56] References Cited

UNITED STATES PATENTS

| 1,745,564 | 2/1930 | Waterman | 17/43 |
| 2,104,450 | 1/1938 | Campbell | 17/43 |
| 2,356,855 | 8/1944 | Knowlton et al. | 69/41 |
| 3,085,421 | 4/1963 | Bucek | 69/42 |

Primary Examiner—Alfred R. Guest
Attorney—Robert E. Isner and Peter J. Franco

[57] ABSTRACT

Process and apparatus for defatting animal pelts by applying selectively mechanical line pressure, e.g. roller pressure, across a longitudinally advancing animal pelt, e.g. across the width of a pair of longitudinally advancing superimposed substantially smooth protecting surfaces facing each other and having the animal pelt situated in covered relation therebetween, and squeezing and forcing gradually and incrementally the adhering fat rearwardly and away from the pelt during such advancing under the mechanical line pressure.

26 Claims, 11 Drawing Figures

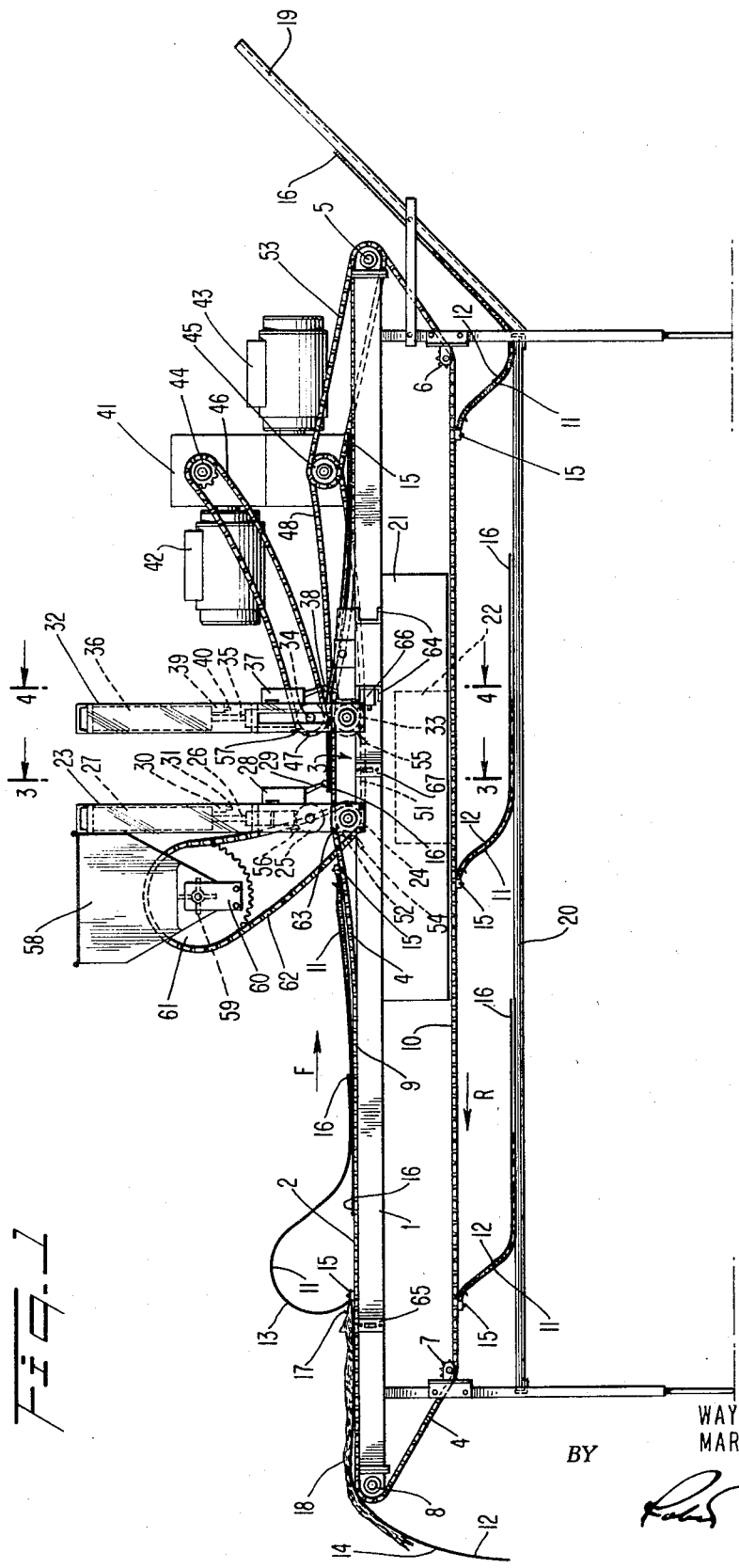

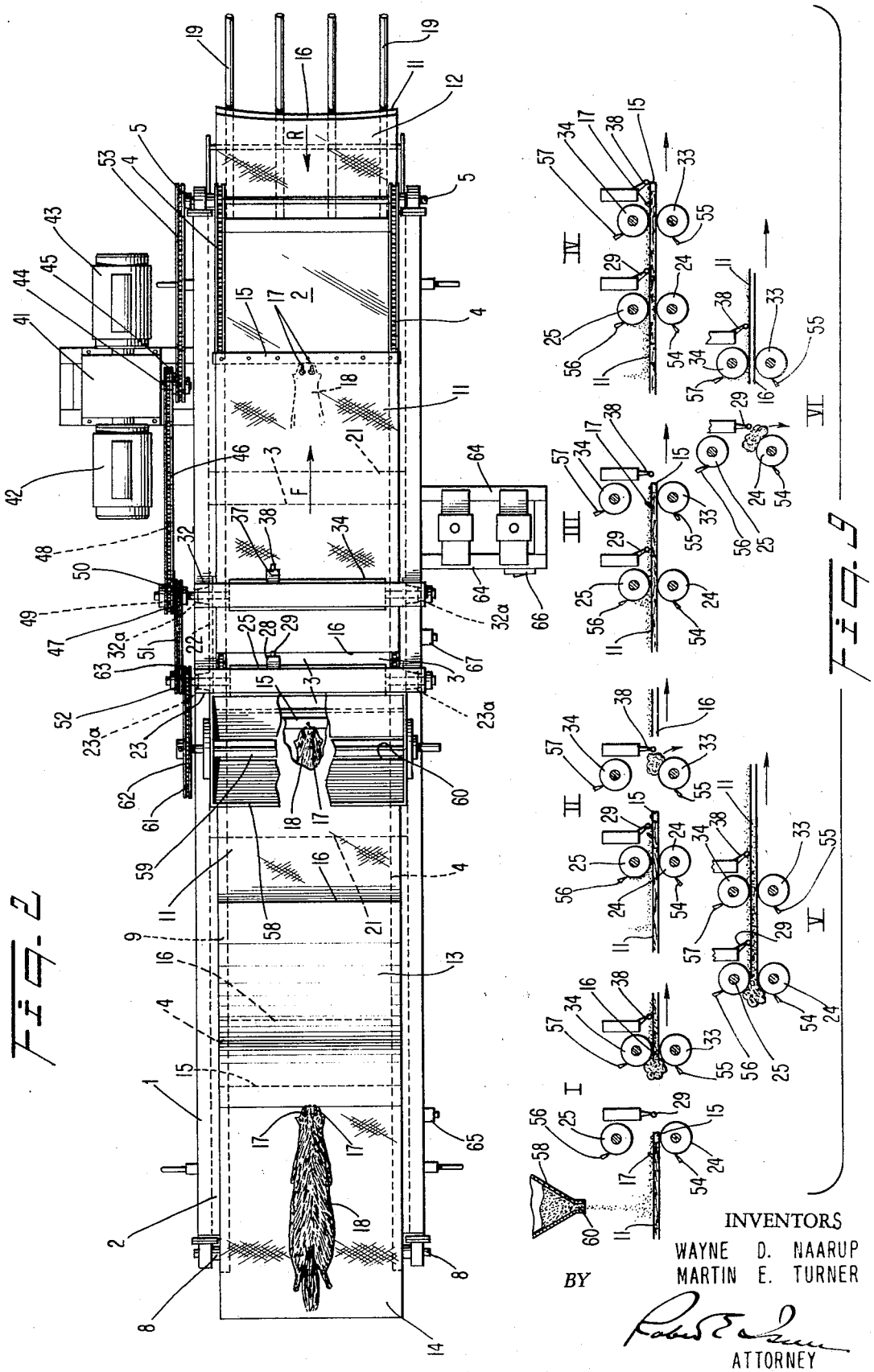

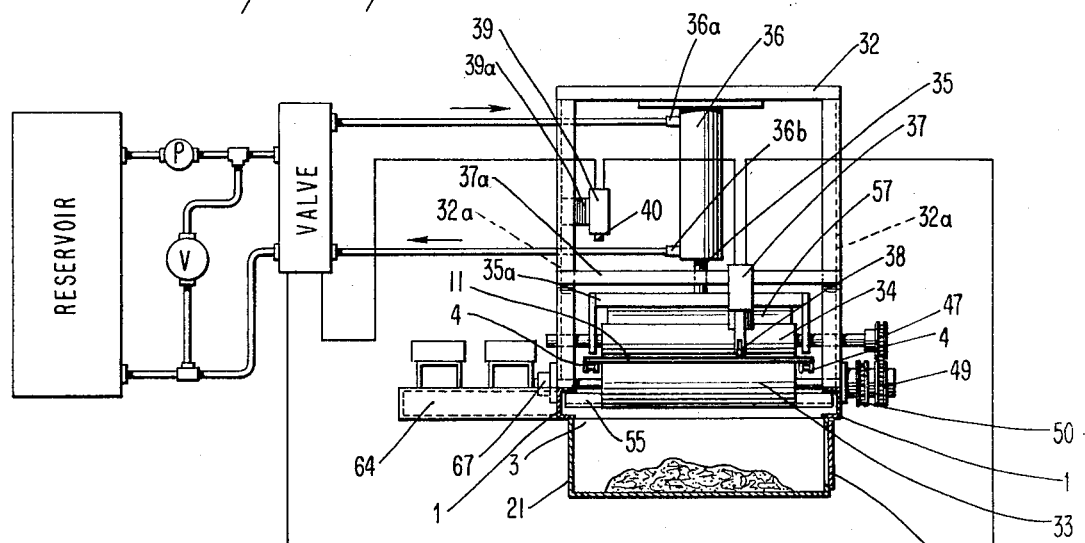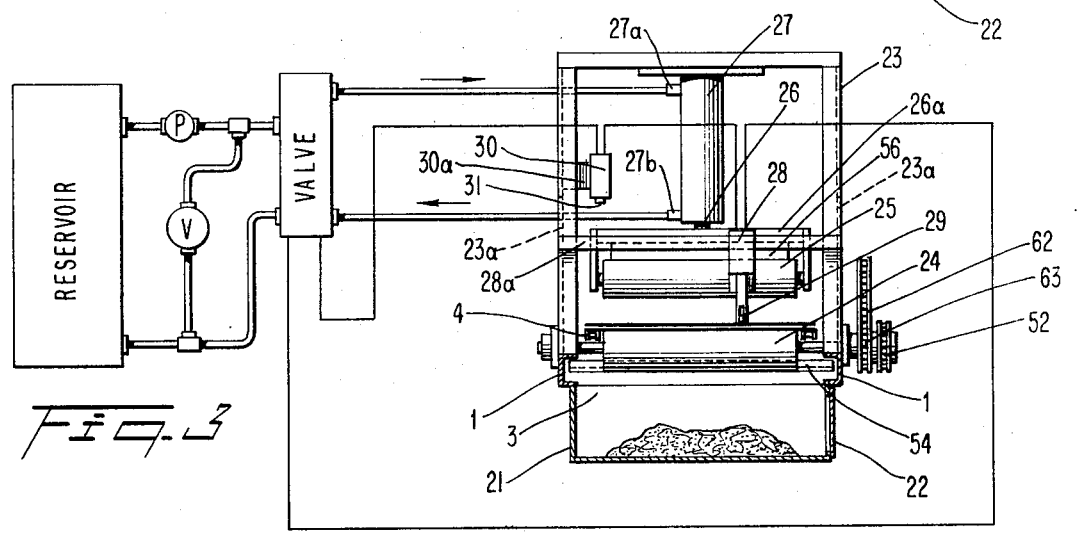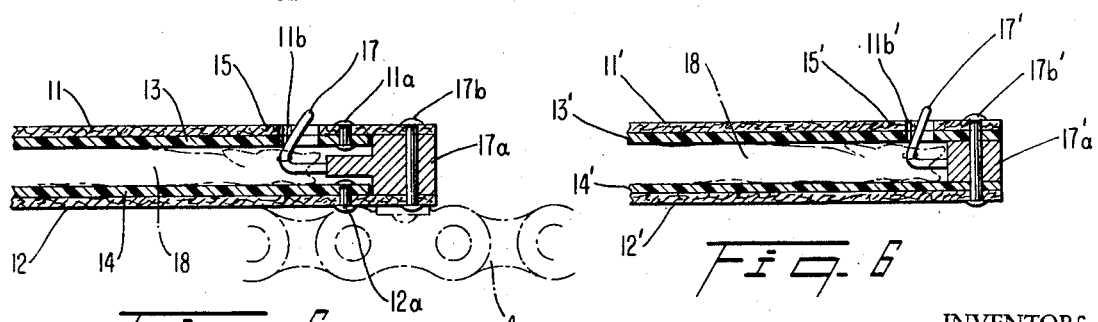

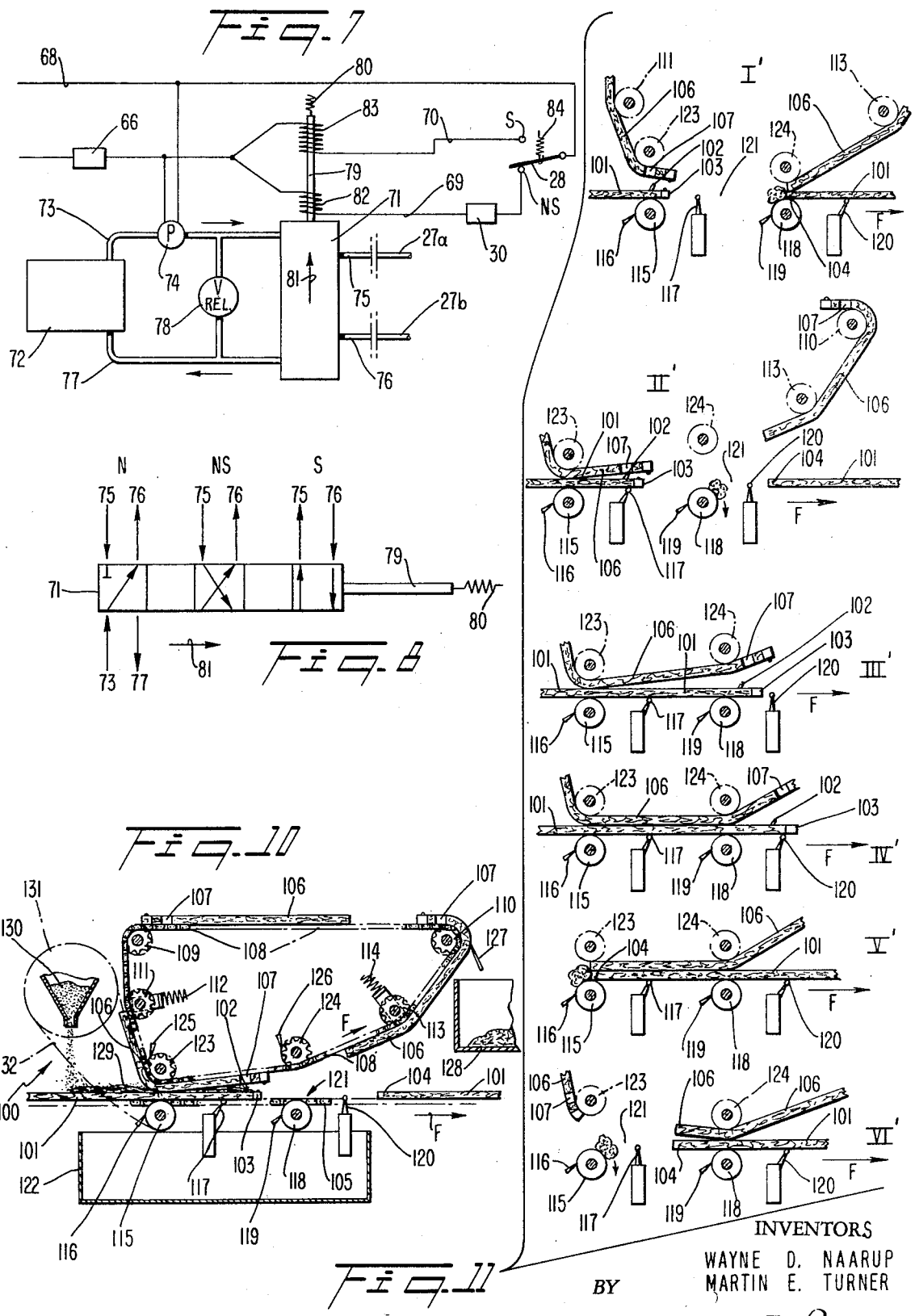

METHOD AND APPARATUS FOR DEFATTING PELTS

The present invention relates to a process and apparatus for defatting animal pelts, and more particularly to the defatting of animal pelts by applying selectively mechanical line pressure to an animal pelt, e.g. situated in covered relation between a pair of longitudinally advancing protecting surfaces, and squeezing and forcing gradually and incrementally the adhering fat from the pelt.

Heretofore, valuable fur-bearing animal pelts such as mink pelts were conventionally defatted, after the skins had been pulled off the body, by a manual operation in which each individual pelt was separately worked. Because of the commercial value of such fur-bearing pelts, they are removed from the animal body substantially intact in tubular form with only the normal head and tail openings in the fur. No longitudinal slitting open of the fur pelt is undertaken to aid in its removal from the body since this would reduce the commercial value of the pelt.

For the conventional defatting operation, the pelt was mounted in inverted form, i.e. fur-side in, on an elongated substantially frusto-conical spindle or roller and a correspondingly curved vibrating knife-like tool was manually pushed and pulled back and forth along the mounted pelt to cut away the adhering fat while slowly turning the spindle or roller to bring into cutting range the portions of the fat around the circumference of the inverted pelt. About 10 to 15 back and forth cutting passes were usually required, even by an experienced worker, in order to defat a given pelt such as a mink pelt. Often, false cuts occurred during such tedious manual operation by inadvertent cutting of the knife-like tool into the reverse side of the pelt, whereupon the commercial value of the pelt was accordingly reduced. An average rate of production of only about 30 pelts, e.g. mink pelts, per hour could be attained for a team of two men carrying out this manual defatting operation.

It is an object of the present invention to overcome drawbacks previously encountered and to provide a method and an apparatus for defatting fur-bearing pelts in an efficient and continuous manner without damaging the fur or pelt or detracting from its inherent commercial value, using a simplicity of operating steps and apparatus elements which permit the attainment of a markedly high rate of production of defatted pelts per hour.

It is another object of the invention to provide a method and apparatus of the foregoing type which generally involve automatic rather than manual operational steps and a minimum of essential equipment.

Other and further objects of the invention will become apparent from a study of the within specification and accompanying drawings, in which:

FIG. 1 is a schematic side elevational view of a fur pelt defatting apparatus according to one embodiment of the invention;

FIG. 2 is a schematic top plan view of the apparatus of FIG. 1 with a portion broken away to show details of construction;

FIGS. 3 and 4 are corresponding schematic views of the roller arrangement portions respectively taken along the lines 3—3 and 4—4 of FIG. 1;

FIGS. 5 and 6 are corresponding schematic enlarged longitudinal sectional views of portions of respective alternate embodiments of pelt retainers and affixing means for removably stationarily situating between the pelt retainers a fur-bearing pelt to be defatted;

FIG. 7 is a schematic view of a solenoid valve, switch actuating circuit and hydraulic pressure arrangement for displacing a corresponding upper roller of the embodiment of FIG. 1 into and out of operative engagement relation with the given lower roller and for exerting roller pressure when in operative engagement relation;

FIG. 8 is a schematic view of the solenoid valve of FIG. 7, illustrating the actuating positions thereof for raising and lowering a given upper roller and for exerting roller pressure when in lower operative engagement relation position;

FIG. 9 is a schematic composite view illustrating the operation sequence of the upper rollers of the embodiment of FIG. 1;

FIG. 10 is a schematic side elevational view of a portion of a defatting apparatus according to another embodiment of the invention; and FIG. 11 is a schematic composite view illustrating the operational sequence of the upper rollers of the embodiment of FIG. 10.

It has been found in accordance with the present invention that a method and an apparatus may now be provided for defatting fur-bearing animal pelts in an efficient and continuous manner without damaging the fur or pelts or detracting from the inherent commercial value thereof, using a simplicity of automatic operating steps and a minimum of essential apparatus elements.

Broadly, the process for defatting animal pelts comprises applying selectively mechanical line pressure across the width of a longitudinally advancing animal pelt, and squeezing and forcing gradually and incrementally the adhering fat from the pelt during such advancing under the mechanical line pressure. The mechanical line pressure is preferably applied across the width of the pelt indirectly through a pair of corresponding longitudinally advancing protecting surfaces between which the pelt is situated for advance in unison therewith, and more especially the mechanical line pressure is individually applied across the width of the pelt indirectly through the pair of protecting surfaces at least at two corresponding longitudinally spaced apart points for cumulative squeezing and forcing of such fat rearwardly and away from the corresponding trailing end of the pelt during the advancing.

More particularly, the process includes applying selectively mechanical line pressure across the width of a pair of longitudinally advancing superimposed substantially smooth protecting surfaces facing each other and having a tubular animal pelt, e.g. a mink pelt, longitudinally situated fur-side out in covered relation therebetween, and squeezing and forcing gradually and incrementally the adhering fat from the interior of the tubular pelt rearwardly and out from the corresponding trailing end of the pelt during such advancing under the mechanical line pressure. As noted above, the mechanical line pressure is preferably individually applied across the width of the pair of protecting surfaces at least at two corresponding longitudinally spaced apart points for cumulative squeezing and forcing of such fat rearwardly and out from the trailing end of the pelt during the advancing.

Desirably, the longitudinally advancing of the pair of protecting surfaces is carried out in unison under substantially constant selective positive forward pulling force with the pelt stationarily situated therebetween, and the mechanical line pressure is substantially constant selective line pressure. The fat squeezed and forced out from the trailing end of the pelt enters the area between the corresponding trailing portions of the pair of protecting surfaces thereat and is discharged substantially from between such trailing portions during continued advance of the pair of protecting surfaces under the mechanical line pressure.

As to the apparatus for defatting such animal pelts, the same contemplates means defining a pair of substantially smooth protecting surfaces, e.g., in the form of a pair of pelt retainers each having a substantially smooth protecting surface, and together being advanceable along a path in substantially superimposed relation with said protecting surfaces inwardly facing each other, affixing means for removably stationarily situating the animal pelt to be defatted in covered relation between such inwardly facing protecting surfaces during advance along the path, coacting pressure rollers positioned operatively in the path, and conducting means for advancing in unison the pair of protecting surfaces, e.g., such retainers, in such superimposed relation and the affixing means along the path and into operative pressure engagement of the protecting surfaces, e.g., such retainers, with the rollers to squeeze and force gradually and incrementally the adhering fat from the pelt stationarily suitable by the affixing means between the pair of protecting surfaces.

More especially, at least two corresponding longitudinally spaced apart pairs of coacting pressure rollers are positioned operatively in the path, and the conducting means for advancing the pair of protecting surfaces, e.g., such retainers, includes traction means for advancing the pair of protecting surfaces, e.g., such retainers, under substantially constant selective positive forward pulling force along the path. Also, the coacting pressure rollers are provided with means for exerting substantially constant selective roller pressure. Advantageously, distribution means may be operatively situated adjacent the path for selectively distributing fat-absorbing particulate material thereacross, and the protecting surfaces may be in the form of substantially fat-impervious and imperforate surfaces.

Referring to the drawing, and initially to FIG. 1, an apparatus for defatting fur-bearing animal pelts is shown including a longitudinal platform 1, having a top guiding surface 2 provided with an elongated fat discharge opening 3 therethrough, on which a pair of substantially parallel endless traction means, e.g., in the form of endless drive chains 4, is mounted operatively via the drive sprocket axle 5 and the idler sprocket axles 6, 7 and 8 for linear travel in unison along an endless path in laterally spaced apart relation (see FIG. 2). Each such chain 4 has a forward traction section 9 along the top guiding surface 2 and a return traction section 10 substantially along the underside of the platform 1.

A plurality of pairs of corresponding superimposed upper and lower pelt retainers 11 and 12 of selective corresponding length, respectively having their leading end portions fixed together at 15 and their trailing end portions 16 freely disposed, are arranged in longitudinally spaced apart relation and across the lateral space between the pair of parallel traction chains 4 (see FIG. 2). Retainers 11 and 12 are connected at their corresponding leading end portions at 15 onto both of such traction chains 4 for displacement in the forward direction of arrow F along the top guiding surface 2 and in the return direction of arrow R substantially along the underside of the platform 1. The retainers 11 and 12 of each pair have substantially smooth, and preferably also slippery, protecting surfaces 13 and 14, respectively, inwardly facing each other.

Affixing means, e.g., in the form of a pair of eye hooks 17, are fixedly positioned at the leading end portions of each retainer pair at 15 for removably stationarily situating an animal pelt 18, e.g., a mink pelt, to be defatted in covered relation between the inwardly facing protecting surfaces 13 and 14 of such retainers. Conveniently, the animal pelt 18 which has been removed intact in substantially tubular form from the animal carcass by pulling or peeling off the same without longitudinal slitting open of the pelt, can be substantially stationarily and longitudinally situated fur-side out in covered relation between the corresponding protecting surfaces 13 and 14 by simply engaging or hooking the eye holes of the pelt over the pair of eye hooks 17 (see FIG. 2).

As the pairs of pelt retainers 11 and 12 reach the sprocket axle 5 during passage of chains 4 along forward traction section 10, they flip onto the inclined receiving slide 19 due to the freely disposed condition of the trailing end portions 16 thereof, and then pass along the supporting slide 20 during passage of chains 4 along return traction section 10.

The fat receiving trough 21 is disposed beneath top surface 2 in alignment with fat discharge opening 3 and contains a lateral fat removal opening 22 on the side of platform 1 remote from that shown in FIG. 1. Discharge opening 3 is selectively longitudinally dimensioned so that insufficient free space is available thereat for the freely disposed trailing end portions 16 of the pairs of retainers 11 and 12 spanning such opening to fall thereinto and become soiled with excess fat.

Upright first roller frame 23 (see FIG. 3) and upright second roller frame 32 (see FIG. 4) are disposed on platform 1 in the endless path of the forward traction section 9 and more or less overlie discharge opening 3 and receiving trough 21. A first pair of superimposed coacting pressure rollers, including a fixed position lower driven roller 24 and a displaceable upper idler roller 25, is arranged in frame 23. In the same way, a second pair of superimposed coacting pressure rollers, including a fixed position lower driven roller 33 and a displaceable upper driven roller 34, is arranged in frame 32. The first and second pairs of rollers are arranged in corresponding frames 23 and 32 in longitudinally spaced apart ordinal relation operatively in the retainer path crosswise of the pair of forward traction sections 9 and in the lateral space therebetween at the discharge opening 3, with the lower rollers 24 and 33 being situated below and the upper rollers 25 and 34 being situated above substantially the level of the forward traction sections 9.

Individual linear displacement means, such as pressure fluid medium operated pressure rams, e.g., piston rods 26 and 35 and piston-cylinder arrangements 27 and 36, respectively, are operatively positioned in corresponding frames 23 and 32 for displacing respectively each of the upper rollers 25 and 34 into and out of operative engagement relation with the corresponding lower roller 24 or 33, as the case may be. Also, individual pressure exerting means, e.g. a solenoid valve system controlling the corresponding flow of a pressure fluid medium, such as hydraulic fluid, from a reservoir (see FIGS. 7 and 8), are provided for exerting pressure respectively on each of the upper rollers when in operative engagement relation with the corresponding lower roller.

As shown in FIG. 3, upper idler roller 25 is slidably situated in lateral guide slots 23a; 23a of frame 23 and journalled in bracket 26a which is attached to the end of piston rod 26 for rotation and vertical displacement of such roller. Lower driven roller 24 is stationarily situated in frame 23 and journalled thereat for rotation alone.

In the same way, as shown in FIG. 4, upper driven roller 34 is slidably situated in lateral-guide slots 32a; 32a of frame 32 and journalled in bracket 35a which is attached to the end of piston rod 35 for rotation and vertical displacement of such roller. Lower driven roller 33, like roller 24, is stationarily situated in frame 32 and journalled thereat for rotation alone.

Thus, in the embodiment shown, the piston-cylinder arrangements 27 and 36 each contain a double-acting piston (not shown) within the cylinder which is connected to the corresponding piston rod 26 or 35, so that upon controlled actuation of the solenoid valve system, the upper rollers 25 and 34 may be individually raised or lowered by corresponding flow of pressure fluid medium, via port 27a or 27b and piston-cylinder arrangement 36, as the case may be (see FIGS. 3 and 4), to one side or the other of the particular double-acting piston as appropriate. By reason of such controlled actuation, the upper rollers 25 and 34 may also be individually maintained under defatting pressure in the lowered operative engagement relation position through exertion of constant pressure fluid medium force against the upper face of the particular piston.

To actuate the individual linear displacement means and individual pressure exerting means, a pair of longitudinally spaced apart retainer follower sensing members, e.g., in the form of pivoted follower arms 29 and 30 of valve control switches 28 and 37 mounted respectively via struts 28a and 37a on frames 23 and 32, are operatively positioned at selective points respectively beyond, i.e. downstream of, the corresponding first and second pairs of rollers in the path of the retainers along the forward traction sections 9.

The follower arms 29 and 30 sense sequentially the movement of the leading and trailing end portions of each pair of superimposed retainers 11 and 12 therepast, and actuate respectively, via the corresponding valve control switches 28 and 37 and the solenoid valve system, the individual linear displacement means, e.g. the piston-cylinder arrangements 27 and 36 and the piston rods 26 and 35, to displace the corresponding upper rollers 25 and 34 into operative engagement relation position when the leading end portions at 15 of a pair of retainers 11 and 12 is sensed and to displace such upper rollers 25 and 34 out of operative engagement relation position when the trailing end portions 16 of such pair of retainers is sensed.

Follower arms 29 and 30 also actuate respectively, via the corresponding switches 28 and 37 and such solenoid valve system, the individual pressure exerting means in the form of the pressure so as to exert pressure on the corresponding upper roller when in such operative engagement relation position.

Additionally, a pair of upper roller sensing members, e.g. in the form of contact buttons 31 and 40 of normally closed button switches 30 and 39, is provided. Switches 30 and 39 are operatively positioned respectively via support blocks 30a and 39a (see FIGS. 3 and 4) at selective points in the paths of vertical displacement of the corresponding upper rollers, remote from the position of operative engagement relation with the corresponding lower rollers, for actuating respectively via buttons 31 and 40 the solenoid valve system for controlling the individual pressure exerting means to arrest such pressure fluid medium when the corresponding upper roller is out of operative engagement relation position.

Conjoint traction and roller driving means are provided which include for example the gear box 41 on which the drive motors 42 and 43 are operatively mounted for powering sprocket drive shafts 44 and 45, respectively. While two separate motors are shown, one may suffice depending on the size thereof since the gearing in gear box 41 is arranged to provide one or more drive shafts for powering the parallel traction chains 4 and the three driven rollers 24, 33 and 34 through appropriate sprocket arrangements, preferably at the same constant speed.

Sprocket drive shaft 44 is operatively connected via drive chain 46 or the like with roller sprocket 47 of the second upper roller 34. Drive chain 46 has some slack or sag therein sufficient to permit unhindered vertical displacement of roller sprocket 47 with second upper roller 34 within the guide slots 32a; 32a provided in the sides of frame 32 when roller 34 is displaced into and out of operative engagement relation with second lower roller 33.

Sprocket drive shaft 45 is operatively connected at one sprocket via drive chain 48 or the like with roller sprocket 49 of the second lower roller 33. This sprocket and chain system in the embodiment shown happens to be in the same vertical plane as and underlies the sprocket and chain system including sprocket drive shaft 44, drive chain 46 and roller sprocket 47. Hence the arrangement of parts for driving the second lower roller 33 is not fully shown in FIG. 2.

Disposed inwardly of sprocket 49 on the second lower roller 33 is a take-off drive sprocket 50 which in turn is operatively connected by drive chain 51 or the like with roller sprocket 52 of the first lower roller 24 to drive the latter (see FIG. 4).

Sprocket drive shaft 45 is also operatively connected at another sprocket via drive chain 53 or the like with sprocket axle 5 to drive the pair of parallel traction chains 4 (see FIGS. 1 and 2).

Accordingly, sprocket drive shaft 44 drives the second upper roller 34 in any position of displacement thereof via chain 46 and roller sprocket 47, whereas sprocket drive shaft 45 not only drives the second lower roller 33 via chain 48 and roller sprocket 49, and in turn the first lower roller 24 via chain 51 and roller sprockets 50 and 52, but also the sprocket axle 5 and traction chains 4 via chain 53.

The rotational speeds of the drive shafts and the sizes of the various sprockets are preferably selected such that a synchronous constant peripheral rotational roller speed will be attained for rollers 24, 33 and 34, in any position of displacement of the upper rollers 25 and 34, which will match the correspondingly constant linear speed of travel of the parallel chains 4 to permit the pairs of retainers 11 and 12 to advance along the path represented by the forward traction section 9 in unison under substantially constant selective positive forward pulling force at a substantially constant selective linear speed and without hindrance or slippage at the coacting pairs of rollers.

Specifically, the conjoint traction and roller driving means represented by the foregoing parts are provided in any convenient form as conducting means for driving in unison, i.e. synchronously, the traction means, e.g. the pair of chains 4, along the path of advance for advancing in unison the pair of retainers under substantially constant selective positive forward pulling force at a substantially constant selective linear speed, and the driven rollers at a corresponding substantially constant peripheral rotational speed in any position of displacement of the upper rollers, so that there is essentially no differential in the conjoint speeds of the rollers and retainer pairs when in line contact with each other.

As the fat is squeezed and forced away from the animal pelt under the individual mechanical line pressure provided by the sets of rollers in frames 23 and 32, such fat will fall into receiving trough 21 through discharge opening 3 in accordance with an operational procedure described hereinafter (see FIG. 9). Since some fat will deposit on the coacting rollers of each set, fat-scraper blades 54, 55, 56 and 57, e.g. Teflon (DuPont Co.) strips, are provided in operative wiping contact with first lower roller 24, second lower roller 33, first upper roller 25 and second upper roller 34, respectively.

Since upper rollers 25 and 34 are mounted for individual selective vertical displacement, their corresponding blades 56 and 57 are also carried by brackets 26a and 35a respectively (see FIGS. 3 and 4) for simultaneous displacement therewith to maintain constant wiping contact of each respective blade with its roller in any position of displacement of such roller. On the other hand, blades 54 and 55 are respectively attached at the sides of platform 1 adjacent the corresponding lower rollers 24 and 33.

To facilitate removal of attendant fat from the outer surfaces of the retainers 11 and 12 and from the rollers of each pair, a distributing hopper 58 or the like, having the rotating distributing blade 59 and outlet slot 60, is mounted on first frame 23 so that slot 60 overlies platform 1 crosswise of top guiding surface 2 preferably just before the front margin of discharge opening 3. Rotating distributor blade 59 is operatively connected via large diameter sprocket 61 and drive chain 62 or the like with an auxiliary sprocket 63 disposed on first lower driven roller 24 inwardly of sprocket 52 for power take-off to drive such rotating blade 59.

The distributing hopper 58 is operatively provided so that outlet slot 60 is ahead of the first pair of coacting rollers 24 and 25 in frame 23 and adjacent the forward traction sections 9 for selectively distributing fat-absorbing particulate material such as sawdust thereacross and onto the path of the pairs of retainers 11 and 12. In the longitudinal spaces or intervals between successive retainer pairs such particulate material will deposit on top guiding surface 2 and be picked up by and adhere to the fat which is present on the underside of the lower retainers 12 as they pass therealong. Alternately, such particulate material will deposit directly on the upper side or top of the upper retainers 11 as they pass under the outlet slot 60.

Such particulate material will then come into contact with the adjacent rollers of each set and transfer thereto at least some of the particulate material so as to absorb attendant fat therefrom and keep the rollers somewhat drier than otherwise. Such particulate material and/or fat adhering to the rollers will be continuously removed via the corresponding wiping blades 54, 55, 56 and 57.

FIG. 1 also shows a side shelf 64 on which the solenoid valve means (see FIGS. 7 and 8) is disposed for operating the fluid pressure medium system for individually exerting pressure when the particular upper roller is in operative engagement relation position. To control the circuit for such valve means a switch 66 is provided on shelf 64.

To control the circuit for the traction and driving means, e.g. motors 42 and 43, a separate switch 65 is provided on platform 1 convenient to the operator who lifts back the upper retainer 11 to remove from the affixing means 17 a defatted pelt and mount in its place a pelt to be defatted as shown at the left side of the apparatus of FIG. 1. In this way, in an emergency switch 65 may be used to shut off the power to motors 42 and 43 and stop the linear movement of chains 4 and the rotation of both sets of rollers.

While switches 65 and 66 are preferably in parallel circuits to permit independent operation of their respective systems, both are conveniently arranged in series with the main power switch 67 controlling the energizing of the overall apparatus.

FIG. 5 illustrates a portion of a pair of elongated pelt retainers 11 and 12 in accordance with one preferred embodiment having the substantially smooth, and preferably slippery, protecting surfaces 13 and 14 in the form of separate sheets or layers facing each other therebetween. Protecting surfaces 13 and 14 are stationarily connected to pelt retainers 11 and 12 via respective fastening means 11a and 12a such as rivets, bolt and nut connections or the like at intervals across their common width adjacent their corresponding leading end portions at 15. The leading edges of retainers 11 and 12, which extend preferably beyond the leading edges of protecting surfaces 13 and 14, are in turn stationarily connected to the crosswise metal bar or strip 17a, interposed therebetween, via fastening means 17b.

Where the leading edges of retainers 11 and 12 and protecting surfaces 13 and 14 are more or less in even alignment, i.e. with the leading edges of protecting surfaces 13 and 14 also extending to bar 17a, such protecting surfaces are connected directly to bar 17a as well as to the corresponding retainers via such fastening means 17b. Fastening means 11a and 12a may then be omitted if desired (cf. FIG. 6).

A pair of affixing means such as side by side hooks 17 (see FIG. 2) is secured to bar 17a in the available space intermediate protecting surfaces 13 and 14 to permit an animal pelt 18, e.g. a mink pelt, to be stationarily situated thereon. The lateral ends of bar 17a are connected to the adjacent parallel pair of chains 4 (see FIG. 2) so that the entire assembly will advance with the chains 4 along the path in question.

Advantageously, by placing the eye holes of the pelt 18 over the hooks 17, especially in the case of a tubular animal pelt having only a tail opening in addition to its normal head opening, the pelt may be longitudinally disposed fur-side out between the protecting surfaces 13 and 14 for the defatting operation without fear of tearing the fur or damaging the pelt under the extreme mechanical line pressure exerted by the rollers. This is true since the retainers 11 and 12, the protecting surfaces 13 and 14, the bar 17a, the hooks 17 and the hook-mounted pelt 18 will all advance along the path in unison under the substantially constant selective positive forward pulling force of the traction chains 4.

Apertures 11b are preferentially provided in the upper retainer 11 and upper protecting surface 13 to accommodate the pair of hooks 17 upwardly extending thereat (see FIG. 2). It will be realized, however, that the fastening means 11a, 12a and 17b as well as hooks 17 may be formed so as to be substantially flush with the top and bottom surfaces of the assembly at the leading end portions of the retainers, i.e. at 15, to minimize friction and wear of these parts and permit relatively unhindered travel of the assembly along the path especially in the vicinity of the rollers.

FIG. 6 illustrates a portion of a corresponding assembly similar to that of FIG. 5 but which is modified to the extent that the protecting surfaces 13' and 14' are coating layers integrally connected throughout their common extent to the adjacent surfaces of the retainers 11' and 12', e.g. as fused or bonded laminates therewith. Thus, the composite layers are attached at their common leading end portions at 15' to bar 17a' via fastening means 17b', and the pair of eye hooks 17' extend upwardly through a common aperture 11b' in the upper laminate 11' — 13'.

In this modification embodiment also, the corresponding parts all advance along the path in unison under the substantially constant selective positive forward pulling force of the traction chains 4. Furthermore, fastening means 17b' and hooks 17' are preferably provided so as to be substantially flush with the top and bottom surfaces of the assembly at the leading end portions of the retainers for the foregoing reasons.

The protecting surfaces may be formed of suitable material such as plastic material which is able to withstand the mechanical line pressure of the rollers without damage, yet which is substantially smooth and preferably also slippery to enhance fat removal. Teflon (DuPont Co.), polyethylene and the like are examples of such materials. The pelt retainers serve as backing for such protecting surfaces and may be provided as fiber-reinforced composition belting, rubber belting, fiber-reinforced rubber belting, and the like, which may be coated or laminated with a Teflon or polyethylene plastic layer as the protecting surface in the case of the modified embodiment of FIG. 6. The pelt retainer material should provide some cushioning for the protective surfaces and pelt during the defatting under the mechanical line pressure to facilitate the operation and minimize the possibility of tearing the fur or damaging the pelt.

In accordance with an optional feature, the top retainer 11 can be omitted and the top protecting surface 13 used alone with the cushioning bottom retainer 12 and its protecting surface 14, or both retainers 11 and 12 can be omitted and the pair of protecting surfaces 13 and 14 can be used alone, by merely attaching the particular sheeting layers containing such surfaces to the appropriate bar 17a or 17a'. In these modification embodiments, the protecting surfaces 13 and 14, or 13' and 14', as the case may be, should be provided in the form of sheeting layers with a sufficient thickness dimension and structural resistance to withstand the roller pressure in question without damage. The pelt retainer sheeting material must also be able to withstand such roller pressure.

Of course, the protecting surfaces 13 and 14 are actually provided in the form of appropriate faces on a suitable sheeting or webbing material which may be internally or externally reinforced, especially when one or both of the pelt retainers of the corresponding pair are omitted, whereas protecting surfaces 13' and 14' are provided as outermost layers laminated or fused to the corresponding retainers 11' and 12' or to similar substrate sheeting or webbing material, which may be reinforced as aforesaid, and disposed in inwardly facing relation. In either case, these various exemplified forms of the means defining the protecting surfaces preferably include protecting surfaces which are substantially fat-impervious and/or substantially imperforate, to facilitate fat removal and to minimize accumulation of fat in the various sheeting layers or belting of the composite assembly.

FIG. 7 illustrates schematically the pressure fluid medium and valve system for operating the individual linear displacement means for displacing the upper roller 25 and the individual pressure exerting means for exerting pressure on such roller 25 when in operative engagement relation with the corresponding lower roller 24. Valve system circuit 68 containing shut-off switch 66 (see FIG. 1) powers a pressure fluid medium pump 74, and both a roller displacement sub-circuit 69 and a roller pressure exerting sub-circuit 70 for an electrically operated valve, e.g. a three-way solenoid valve 71.

Pressure fluid medium, e.g. hydraulic fluid such as oil or pneumatic fluid such as air, is maintained in reservoir 72 and conducted via pump 74 through pressure line 73 to valve 71 and returned through discharge line 77. A check valve 78, i.e. in the form of a pressure relief valve, operable upon reaching a selective threshold overpressure is preferably provided between lines 73 and 77 intermediate reservoir 72 and valve 71 to facilitate recycle flow from pump 74 back to the reservoir when the valve is in closed or neutral position or where abnormally high pressures are encountered in the system.

Solenoid valve 71 is normally biased in the direction of arrow 81 to the neutral or closed position N via spring 80 acting on solenoid shaft 79. A first solenoid coil 82 operatively positioned with respect to solenoid shaft 79 is provided in series in roller displacement sub-circuit 69 along with button switch 30 and the non-sensing pole position NS of switch 28 (see FIG. 3). A second solenoid coil 83 correspondingly operatively positioned with respect to solenoid shaft 79 is provided in series in the roller pressure exerting sub-circuit 70 together with the sensing pole position S of switch 28. Switch 28 and follower arm 29 are normally biased by spring 84 to the NS pole position in the conventional manner. Sub-circuits 69 and 70 are arranged in parallel with each other in main circuit 68 so as to operate selectively valve 71 by suitable energizing of coil 82 or coil 83, as the case may be, in dependence upon the positions of switches 30 and 28.

In the selective sequential operation of valve 71, as shown schematically in FIG. 8, such valve is displaced from the neutral position N at which no flow of pressure fluid medium can take place to the sensing position S when the leading end portions at 15 of a pair of retainers 11 and 12 strike the follower arm 29 to pivot such arm onto the top retainer 11 and change switch 28 from the NS position to the S position, thereby energizing coil 83 (FIG. 7). This causes flow of pressure fluid medium through service line 75 to port 27a of piston-cylinder arrangement or ram means 27 and from port 27b through service line 76 as well as displacement of roller 25 downwardly into operative engagement relation position with roller 24 and exertion of constant roller pressure thereat during the entire time that follower arm 29 is in contact with the top retainer of the pair.

When the trailing end portions 16 of the retainer pair move past follower arm 29, the arm pivots back under the biasing force of spring 84 in its former non-sensing position from such sensing position whereby switch 28 returns to the NS position, deenergizing coil 83 and energizing coil 82. Valve 71 then moves to the non-sensing positions NS to cause reverse flow of such pressure fluid medium through service line 76 to port 27b of piston-cylinder arrangement or ram means 27 and from port 27a through service line 75 as well as displacement of roller 25 upwardly and out of operative engagement relation position with roller 24. When bracket 26a reaches and contacts button 31, normally closed switch 30 opens, deenergizing coil 82, so that spring 80 returns valve 71 to the neutral position N.

When the next retainer pair strikes follower arm 29 to change switch 28 to S position, the sequence is repeated and upon downward movement of roller 24, button 31 is released and switch 30 returns to its normally closed or energizing position.

A similar solenoid valve system and circuit arrangement (cf. FIGS. 3 and 4), including correspondingly switch 37 and follower arm 38, as well as button switch 39 and button 40, is provided for achieving the sequential displacement of upper roller 34. The sub-circuits therefor may be connected to main circuit 68 in the same way as sub-circuits 69 and 70. The pressure fluid medium flow lines to the valve and in turn ports 36a and 36b of piston-cylinder arrangement or ram means 36 may be connected appropriately to reservoir 72 by a separate flow line system and pump, or if desired, via flow lines 73 and 77 in a separate system in parallel with the flow lines leading to valve 71 at a point beyond the check valve 78.

FIG. 9 depicts schematically the sequential phases I to VI of the defatting operation of the two pairs of rollers. In phase I, as the leading end portions of a retainer pair containing a pelt to be defatted pass over the first lower roller 24, such portions come into the range of the follower arm 29 pivoted downwardly to the non-sensing or normal rest position. First upper roller 25 is disposed in the upper or normal rest position so that such leading end portions and especially hooks 17 clear the roller breach in an unhindered manner. By selectively determining the spacing intervals between the successive retainer pairs as well as the spacing of frames 23 and 32, at this point the trailing end portions of the previously treated retainer pair will have just reached the nip of the second set of rollers, i.e. second upper roller 34 and second lower roller 33 in pressure engagement relation. The fat is discharged in a mass or ball in the upstream nip of the second set of rollers but because of its butter-like consistency does not fall through opening 3 into trough 21.

In phase II, the follower arm 29 is struck by the leading end portions of the retainer pair to actuate switch 28 and displace upper roller 25 downwardly into pressure engagement relation with lower roller 24 and to maintain a constant roller pressure so long as follower arm 29 is in contact with the top of the retainer pair and switch 28 is in the sensing position S against the force of spring 84. The position of follower arm 29 ahead, i.e. downstream, of the first set of rollers 24, 25 is selected such that the upper roller 25 reaches the downward coacting contact position immediately after hooks 17 have passed through the gap of the rollers. On the other hand, the trailing end portions of the previous retainer pair have passed follower arm 38 and the latter has returned to non-sensing position while roller 34 has been upwardly displaced by the same type valve system mechanism as that shown in FIGS. 7 and 8 for raising and lowering roller 24. Since lower roller 33 is still rotating, the mass of fat formerly in the upstream nip of the second set of rollers and which adheres to roller 33 is carried through the roller gap thereby and falls through opening 3 and into trough 21.

In phase III, the leading end portions of the retainer pair undergoing defatting roller pressure between the first set of rollers 24 and 25 pass through the gap in the second set of rollers 33 and 34 and are about to strike follower arm 38 now in the non-sensing position. Follower arm 38 is similarly positioned ahead, i.e. downstream, of the second set of rollers to achieve the desired timing of the displacement of roller 34 in relation to the movement of the corresponding pelt retainer pair therepast.

In phase IV, the leading end portions of the retainer pair have passed through the gap between rollers 33 and 34 and after striking follower arm 38 effect the downward displacement of upper roller 34 into operative engagement relation position by the above-referred to mechanism. Since both follower arms 29 and 38 are in contact with the top of the retainer pair, both corresponding upper rollers 25 and 34 remain in pressure engagement disposition and carry out an incremental and gradual squeezing and forcing of the adhering fat away from the interior of the tubular pelt and rearwardly and out from the trailing end of the pelt during passage of the retainer pair along the path of advance.

In phase V, the trailing end portions of the retainer pair have reached the first set of rollers 24 and 25 and the mass of fat has been discharged from the trailing area of the retainer pair and deposits in the upstream nip of rollers 24 and 25.

In phase IV, the trailing end portions have passed follower arm 29 and the latter has returned to non-sensing position, whereby switch 28 is changed to its corresponding non-sensing position, causing roller 25 to be raised out of operative engagement relation with roller 24 and the mass of fat to rotate on lower roller 24 through the corresponding gap and fall by gravity through opening 3 into trough 21. As such trailing end portions reach the nip of the second set of rollers 33 and 34, the cycle will be in the state shown in phase I.

Any attendant fat is removed from the corresponding rollers by the wiper blades 54, 55, 56 and 57, respectively, supplemented by sawdust or the like supplied via hopper 58 as discussed above. Of course, any other system of removing the discharged fat can be employed such as appropriately situated wide mouth suction tubes which draw away the fat from the upstream nip of each set of rollers as it is squeezed out from the area between the trailing end portions of the particular retainer pair. Scraper blades 54, 55, 56 and 57, in such instance, can be provided as such wide mouth suction tubes.

The use of an idler roller for the first upper roller 25 is preferred since this minimizes rotational and longitudinal stresses on the retainers 11 and 12, yet the remaining three rollers are optimally provided as constant speed driven rollers to assure positive forward movement of the retainer pairs by aiding the force component provided by the traction chains 4. This is understandable when the composite thickness of the retainer pair containing the pelt to be defatted therebetween is considered as well as the constant presence of fat on the rollers and retainer surfaces.

If the rollers were able to spin freely by slipping on fat situated between the rollers and the retainer outside surfaces, rather than to rotate at a speed consonant with the linear speed of travel of chains 4 and the corresponding pelt retainer pairs, possible tearing of the fur or damage to the pelt might occur, due to abrupt changes in the relative speeds of the rollers and chains 4 and disturbance of the selective mechanical line pressure employed. The latter is governed by the pressure generated by the pressure fluid medium pump or pumps.

Normally, mechanical line pressures for each set of rollers may individually range from about 800 to 3000 lbs. For instance, for defatting mink pelts roller pressures in the order of about 2,500 to 3,000 lbs (±800 lbs.) are often used without fear of tearing out fur hair or damaging the pelt. Male mink pelts normally require about 200 lbs. higher roller pressure than female mink pelts. In some cases the first set of rollers may be operated at a lower pressure than the second set of rollers, e.g. 800 lbs. and 1,200 lbs. respectively, for progressive or incremental defatting of the animal pelt.

While any suitable dimensions for the rollers and retainers may be utilized, rollers of about 3 inch diameter have been found particularly appropriate as well as retainers of about three-eights to one-quarter inch thickness and protecting surfaces of about one-eighth to one-quarter inch sheet thickness. The driven rollers are particularly effectively used at speeds of about 30 rpm.

Advantageously, the overall assembly, including not only the rollers but also the chains and sprockets, is self-lubricating by reason of the attendant animal fat.

As compared with the prior art method of defatting mink pelts manually, using a vibrating knife-like tool as discussed above, by which two workmen could defat about 30 pelts per hour, the instant apparatus and method with two workmen operating the apparatus, one to remove defatted pelts and the other to hook on pelts to be defatted, can achieve the defatting of about 7 pelts per minute or about 420 pelts per hour with minimum danger of tearing the fur hair or damaging the pelt.

It will be realized that because of the presence of the affixing means, e.g. hooks 17, as well as the bar 17a and the fastening means 11a, 12a and 17b in the case of the retainer assembly of FIG. 5, or of the similar parts 17', 17a' and 17b' in the case of the retainer assembly of FIG. 6, the sets of rollers cannot be maintained in continuous pressure engagement relation as damaged to the roller surfaces would occur when these mechanical parts pass through the roller nips. Hence, the sets of rollers are in operative engagement relation and exert roller pressure substantially only during the advancing of the corresponding pelt-situating portion of the pair of retainers therebetween.

The sensing means, i.e. follower arms 29 and 38, as well as the switches 28 and 37, and buttons 31 and 40, as well as the switches 30 and 39, must therefore be provided operatively in the path of the retainer pairs and the displaceable upper rollers, as the case may be. These sensing means effect precise sequential actuation of the same means for displacing the rollers and for exerting roller pressure so that the individual upper rollers do not contact the aforementioned mechanical parts but only come into contact with the retainer pairs immediately after such mechanical parts have passed through the corresponding roller gap to initiate pressure removal of fat from the leading end portion of the pelt.

FIG. 10 schematically illustrates an alternate embodiment of the apparatus and method of the invention for defatting animal pelts, which contemplates the need for only one workman to remove the defatted pelts and to mount over the eye hooks the pelts next to be defatted at about the same rate of operation obtained with the use of two workmen in the case of the embodiment generally shown in FIGS. 1 to 9. Specifically, by reason of the use of a pair of opposed retainer paths, the second workman is not needed to lay back the upper retainer and protecting surface before removal of the previously defatted pelt (cf. FIG. 1).

The defatting apparatus 100 generally differs from that covered in FIGS. 1 to 9 only in the use of a set of longitudinally spaced apart lower pelt retainers 101, carried at their leading end portions, i.e. at 103, and optionally also at their trailing end portions 104 is desired, by endless parallel traction chains 105, together with a separate set of longitudinally spaced apart upper pelt retainers 106, carried at their marginal lateral side portions or at their leading and trailing end portions by corresponding endless parallel traction chains 108.

The lower set of retainers 101 is disposed on a platform for travel along the path of advance in the forward direction F and in the return direction (not shown) in the same manner as in the arrangement of FIG. 1. The upper set of retainers 106 is oppositely disposed over the rollers 109, 110, 111, 113, 123 and 124 for travel along the corresponding path of advance in the forward direction F and in the return direction R.

The animal pelts, e.g. mink pelts, are mounted on affixing means, e.g. via eye hooks 102 at 103, longitudinally situated fur-side out in the aforedescribed manner for mechanical line pressure defatting between the first pair of coacting rollers 115 and 123 and the second pair of coacting rollers 118 and 124.

The stationarily positioned lower rollers 115 and 118 and the vertically displaceable upper rollers 123 and 124 are provided with fat scraper blades 116, 119, 125 and 126 respectively in wiping contact therewith. Optionally, a further fat scraper blade 127 may be operatively positioned adjacent the outer face of the upper pelt retainers to remove any residual fat therefrom and deposit such fat in the adjacently positioned trough 128. Alternatively, wide mouth suction tubes may be provided in addition to or in place of these various scrapers to draw away attendant fat.

Slots or appertures 107 are provided in the upper retainers 106 so as to coincide or register with the eye hooks 102 during passage of the lower retainers 101 and the upper retainers 106 in superimposed relation along the opposing paths defined by traction chains 105 and 108 when in operative contact with each other.

Follower arms 117 and 120, corresponding in function with follower arms 29 and 38 of the embodiment of FIG. 1, are normally disposed upwardly into the path of the leading end portions of the lower retainers 101 in the intervening space 121 between the parallel traction chains 105. The remaining switching system and valve and pressure fluid medium system are generally the same as those described above for the embodiment of FIG. 1, so that the vertically displaceable rollers 123 and 124 individually move downwardly when follower arms 117 and 120 are actuated to sensing position and individually exert substantially constant defatting pressure until follower arms 117 and 120 individually return to non-sensing position, whereupon the rollers 123 and 124 are individually upwardly displaced out of operative pressure engagement relation with the respective lower rollers 115 and 118 until the appropriate button switches, i.e. 30 and 39, are contacted to change the particular solenoid valve, e.g. valve 71, to neutral position.

Lower rollers 115 and 118 and upper roller 124 are preferably driven rollers while upper roller 123 is preferably an idler roller in the same manner as in the embodiment of FIG. 1. By reason of the use of similar drive means for operating endless parallel traction chains 108 to that used for operating endless parallel traction chains 105 as well as for driving rollers 115, 118 and 124, in accordance with the conducting means arrangement shown in the embodiment of FIG. 1, the pairs of endless chains 105 and 108, having the animal pelt 129 stationarily mounted via its eye holes over hooks 102 and situated operatively between a pair of superimposed retainers 101 and 106, travel in unison along the path of advance in the common direction F at a selective constant linear speed corresponding to the constant peripheral rotational speed of the driven rollers 115, 118 and 124, with the pair of retainers 101 and 106 being conducted along the path under the simultaneous common substantially constant selective positive forward pulling force of the chains 105 and 108.

Auxiliary sprocket rollers 109 and 110 for the upper endless path may be idler rollers or driven rollers, corresponding to sprocket rollers 5, 6, 7 or 8, as the case may be, of the embodiment of FIG. 1, operatively engaging the corresponding parallel chains 108. Tension rollers 111 and 113 for such upper endless path are preferably idler sprocket rollers which are biased by the respective springs 112 and 114 into tension engagement with the parallel traction chains 108 to take up slack individually upon the upward displacement of the corresponding pressure roller 123 or 124 out of operative pressure engagement relation with the particular low roller.

Distributing hopper 130, operable in the manner of and for the same purposes as hopper 58, is suitably positioned above the lower endless path and provided appropriately with drive sprocket 131 and drive chain 132. Fat-absorbing particulate material, e.g. sawdust, is deposited on the upwardly facing protecting surface of each lower retainer 101, which surface corresponds to surface 14 of FIG. 5, as well as on the top guiding surface of the platform on which the undersides of the longitudinally spaced apart retainers 101 are guided. Such platform arrangement is generally the same as platform 1 and surface 2 of FIG. 1. The particulate material is thereby transferred to the downwardly or outwardly facing protecting surface of each corresponding upper retainer 106, which surface corresponds to surface 13 of FIG. 5, as well as to the respective rollers via the undersides of retainers 101.

The leading end portions of the upper retainers 106 are attached to chains 108 to assure positive travel of the retainers in unison with such parallel chains 108, and preferably the trailing end portions are also attached to these chains to prevent unwieldy displacement or flapping of the trailing end portions out of the common path or plane of the parallel traction chains 108. Optionally, the upper retainers 106 may be connected to chains 108 along the entirety of their marginal lateral side portions. While the leading end portions of the lower retainers 101 are attached to chains 105 to assure positive travel of the retainers in unison with such parallel chains 105, the trailing end portions thereof may be freely disposed as in the embodiment of FIG. 1 or may also be attached to such chains.

The same type of attachment to the corresponding chains is used for the individual protecting surfaces when present in the form of appropriate sheets in the manner of the four layer embodiment of FIG. 5 although this is not necessary when such protecting surfaces are present as surface layers fused or bonded to the particular retainers as in the case of the embodiment of FIG. 6.

For each lower retainer a bar (not shown) provided with the affixing means, e.g. hooks 102, and to which the retainer, and also the separate protecting surface sheet if present, are connected, is used. The bar is attached to the parallel chains in the same manner as in the embodiment of FIG. 1. In the appropriate case where the trailing end portion of the particular retainer is also to be attached to the parallel chains, a similar bar (not shown), to which such trailing end portion is connected, is used for this purpose.

A shorter endless path may be used for the upper retainers, having a lesser number of individual retainers 106 than that for the lower path, due to the nature of the operation and especially the fact that a work area must be present in the lower path upstream of the sets of rollers for removing and mounting the pelts.

In an additional embodiment (not shown), similar to the opposing endless coacting path embodiment of FIG. 10, the upper retainers are provided in continuous form as an endless belt or web having an outer protecting surface in continuous form facing the individual lower protecting surfaces of the lower retainers in the endless path therebelow, i.e. in the range of the two successive sets of coacting rollers. The endless composite protecting surface of the upper endless belt composite retainer is preferably in the form of a continuous coating layer bonded or fused to the retainer belt to provide an integral laminate as in the case of the upper composite retainer of the embodiment of FIG. 6.

Slots or appertures for the hooks of the lower retainers are still provided in this modification at selective longitudinally spaced apart points along the endless belt for alignment and registry with the hooks of the lower retainers when the two endless paths come together at the first set of rollers.

For this modification embodiment, the scraper 127 and trough 128 are conveniently provided adjacent the belt in the manner shown in FIG. 10 to facilitate removal of attendant fat from the endless protecting surface thereat, whereas scrapers 125 and 126 may be omitted. The lower retainers, however, are still provided as longitudinally spaced apart separate sheets to permit the discharged masses of fat to fall through the intervening spaces therebetween and into the receiving trough 122 therebelow.

FIG. 11 shows schematically the sequential operation of the opposed endless path embodiment of FIG. 10. Essentially the same operations are carried out by phases I' to VI' as in the case of phases I to VI of the embodiment of FIG. 1 in accord with the corresponding sequence shown in FIG. 9. The main difference is the fact that the upper pair of chains 108 is in constant operative contact with the upper rollers in any position of movement thereof.

After the pelts have been pressure defatted in accordance with the present invention, they may be aftertreated in the conventional manner, for instance by rotating the pelts with sawdust in a container drum to absorb any attendant fat and moisture, and then by rotating the pelts in a cage or wire drum to shake off the fat-absorbed sawdust.

In accordance with all of the embodiments in question, the defatting of animal pelts may be carried out, preferably, by advancing in unison, under substantially constant positive forward pulling force along a longitudinal common path, a pair of superimposed substantially smooth and slippery elongated protecting surfaces inwardly facing each other and having a tubular animal pelt, which has been removed, e.g. substantially intact, in substantially tubular form from the animal without longitudinal slitting open of the pelt, substantially stationarily and longitudinally situated fur-side out in covered relation therebetween; individually applying selectively substantially constant mechanical roller force or pressure across the width of the pair of protecting surfaces at least at two corresponding longitudinally spaced apart points along the path; squeezing and forcing gradually and incrementally the adhering fat from the interior of the tubular pelt rearwardly and out from the corresponding trailing end of the pelt and into the surrounding area between the corresponding trailing portions of such pair of protecting surfaces thereat during advance of the pair of protecting surfaces along the path under the applied mechanical roller pressure; and discharging substantially such fat from between such trailing portions during continued advance of the pair of protecting surfaces along the path under the applied mechanical roller pressure.

In particular, the pelt is preferably situated intermediate the leading and trailing end portions of the pair of protecting surfaces; the roller pressure is applied at two longitudinally spaced apart points along the path, having an intervening distance therebetween which is preferably less than the corresponding length of the longitudinally situated tubular pelt, by respectively moving a pair of coacting pressure rollers at each of such points from a non-engagement position to an operative engagement position; the fat is discharged from between the trailing portions of the pair of pelts onto the respective pairs of rollers during the continued advance of the pair of protecting surfaces along the path; the mechanical roller pressure is individually released by respectively moving the pair of pressure rollers at each of such points from the operative engagement position to the non-engagement position upon corresponding advance therepast of the trailing portions of the pair of protective surfaces; and the discharged fat is finally removed from the pressure rollers.

It will be realized that in order to avoid tearing out of the fur hair and damage of the pelt, the fat is incrementally and gradually squeezed and forced rearwardly and away from the pelt at the two pressure stations represented by the coacting pairs of pressure rollers while simultaneously and synchronously subjecting the pelt stationarily disposed between the protecting surfaces to the positive forward pulling force of the traction means consonant with the selective peripheral rotational speed of the driven rollers.

The use of driven rollers alone, due to the attendant fat, will normally lead to slipping of the rollers on the retainers, e.g. at the particular roller nip, and possible tearing out of fur hair or ripping of the pelt, so that the positive forward pulling force of the parallel traction chains is necessary in addition to the rotational pull of the drive rollers for favorable results. The use of the positive forward pulling force of the parallel traction chains alone with only idler pressure rollers results in the same objectionable slipping and danger to the pelts.

Nevertheless, it has been found sufficient to maintain one of the rollers of the first roller pairs, e.g. the upper displaceable roller, as an idler roller to facilitate initiation of operative pressure contact between the rollers of the first set and the pair of retainers under the positive forward pulling force of the pair of traction chains on such retainer pair. A constant supply of particulate material such as sawdust also aids in preventing slipping between the rollers of each set and the pair of retainers by keeping the roller surfaces sufficiently dry.

In the case of the combined path embodiment, for example shown in FIG. 1, preferably, the pelt retainers of each pair are of selective corresponding length, dimensioned to provide an adequate corresponding pelt-situating portion therebetween, arranged in superimposed relation for advancing along the corresponding endless path, and have their leading end portions fixed together and their trailing end portions freely disposed; the affixing means for removably stationarily situating the pelt to be defatted are fixedly positioned between the corresponding leading end portions of the retainer pair; and the traction means are operatively connected to such leading end portions to advance in unison the pelt retainers with the affixing means fixedly positioned therebetween along the corresponding endless path.

On the other hand, in the case of the opposed paths embodiment, for example that shown in FIG. 10, preferably, the pelt retainers of each pair include an upper pelt retainer, advanceable along a first endless path and having a selective length bounded between a leading and trailing end portion with the corresponding protecting surface thereof disposed on the outer side thereof, and a lower pelt retainer, advanceable along a second endless path and having a selective length bounded between a leading and a trailing end portion with the corresponding protecting surface thereof disposed on the outer side of the second endless path; the affixing means for removably stationarily situating the pelt are fixedly disposed at the leading end portion of the lower pelt retainer on the outer side of the second endless path; and the traction means are respectively operatively connected to the leading and trailing end portions of the upper pelt retainer and to the leading end portion of the lower pelt retainer to advance in unison the upper pelt retainer and the lower pelt retainer with the affixing means fixedly positioned thereat along such paths and in opposing superimposed relation between the coacting rollers.

It will be realized that the term "operative engagement relation position" covers the engagement of the particular upper roller with the corresponding lower roller therebelow, either directly, e.g. after the trailing end portions of a retainer pair have passed through the nip between the coacting rollers and before the upper roller has been displaced to the non-engagement position, or indirectly, e.g. when a retainer pair is disposed operatively therebetween.

Furthermore, while the preferred relationship of stationary and moving parts contemplates the stationary positioning of the pressure rollers and the longitudinal advancing of the animal pelt, e.g. between the pair of protecting surfaces, for the incremental and gradual defatting operation, the opposite relationship can be used in which the pelt, e.g. between the pair of protecting surfaces, is stationarily maintained and the pressure rollers longitudinally advance along the path in question for the defatting. So long as proper relative linear displacement of the correctly positioned pelt and pressure rollers takes place, the desired defatting will be effected in the foregoing manner without tearing the fur or damaging the pelt. The rollers in this latter alternative embodiment (not shown) can be mounted for reciprocal movement, or for movement along opposed endless paths in the manner of the embodiment of FIGS. 10 and 11, such that the corresponding upper and lower rollers of each pair advance in unison at the same rate of movement along the portion of the path where operative pressure contact of the rollers with the pelt, e.g. between a pair of protecting surfaces, is to be effected in the above-described manner.

What is claimed is:

1. Process for defatting animal pelts which comprises applying selectively mechanical line pressure across the width of a longitudinally advancing animal pelt indirectly through a pair of corresponding longitudinally advancing protecting surfaces between which the pelt is situated for advance in unison therewith, and squeezing and forcing gradually and incrementally the adhering fat from the pelt during such advancing under the mechanical line pressure.

2. Process according to claim 1 wherein the mechanical line pressure is individually applied across the width of the pelt indirectly through the pair of protecting surfaces at least at two corresponding longitudinally spaced apart points for cumulative squeezing and forcing of such fat rearwardly and away from the corresponding trailing end of the pelt during the advancing.

3. Process according to claim 1 for defatting animal pelts which comprises applying selectively mechanical line pressure across the width of a pair of longitudinally advancing superimposed substantially smooth protecting surfaces facing each other and having a tubular animal pelt longitudinally situated fur-side out in covered relation therebetween, and squeezing and forcing gradually and incrementally the adhering fat from the interior of the tubular pelt rearwardly and out from the corresponding trailing end of the pelt during such advancing under the mechanical line pressure.

4. Process according to claim 3 wherein the mechanical line pressure is individually applied across the width of the pair of protecting surfaces at least at two corresponding longitudinally spaced apart points for cumulative squeezing and forcing of such fat rearwardly and out from the trailing end of the pelt during the advancing.

5. Process according to claim 3 wherein the longitudinally advancing pair of protecting surfaces is advanced in unison under substantially constant selective positive forward pulling force with the pelt stationarily situated therebetween, and the mechanical line pressure is substantially constant selective line pressure.

6. Process according to claim 3 wherein the fat squeezed and forced out from the trailing end of the pelt enters the area between the corresponding trailing portions of the pair of protecting surfaces thereat and is discharged substantially from between such trailing portions during continued advance of the pair of protecting surfaces under the mechanical line pressure.

7. Process according to claim 3 for defatting animal pelts which comprises advancing in unison under substantially constant positive forward pulling force along a longitudinal path a pair of superimposed substantially smooth and slippery elongated protecting surfaces inwardly facing each other and having a tubular animal pelt, which has been removed in substantially tubular form from the animal without longitudinal slitting open of the pelt, substantially stationarily and longitudinally situated fur-side out in covered relation therebetween, individually applying selectively substantially constant mechanical roller pressure across the width of the pair of protecting surfaces at least at two corresponding longitudinally spaced apart points along the path, squeezing and forcing gradually and incrementally the adhering fat from the interior of the tubular pelt rearwardly and out from the corresponding trailing end of the pelt and into the surrounding area between the corresponding trailing portions of such pair of protecting surfaces thereat during advance of the pair of protecting surfaces along the path under the applied mechanical roller pressure, and discharging substantially such fat from between such trailing portions during continued advance of the pair of protecting surfaces along the path under the applied mechanical roller pressure.

8. Process according to claim 7 wherein the tubular pelt is a mink pelt.

9. Process according to claim 7 wherein the mechanical roller pressure is applied by passing the pair of protecting surfaces between a corresponding pair of coacting pressure rollers at each of two longitudinally spaced apart points along the path.

10. Process according to claim 9 wherein attendant fat is continuously removed from the rollers.

11. Process according to claim 7 wherein the protecting surfaces are substantially fat-impervious and imperforate.

12. Process according to claim 7 for defatting animal pelts which comprises advancing in unison under substantially constant positive forward pulling force along a longitudinal path a pair of superimposed substantially smooth and sliperry elongated protecting surfaces inwardly facing each other and having a tubular animal pelt, which has been removed substantially intact in substantially tubular form from the animal without longitudinal slitting open of the pelt, substantially stationarily and longitudinally situated fur-side out in covered relation therebetween substantially intermediate the leading and trailing portions of such pair of protecting surfaces, individually applying selectively substantially constant mechanical roller pressure across the width of the pair of protecting surfaces at two corresponding longitudinally spaced apart points along the path having an intervening linear distance therebetween less than the corresponding length of the longitudinally situated tubular pelt by respectively moving a pair of coacting pressure rollers at each of such points from a non-engagement position to an operative engagement position, squeezing and forcing gradually and incrementally the adhering fat from the interior of the tubular pelt rearwardly and out from the corresponding trailing end of the pelt and into the surrounding area between the corresponding trailing portions of the pair of protecting surfaces thereat during advance of the pair of protecting surfaces along the path under the applied mechanical roller pressure, discharging substantially such fat from between such trailing portions onto the respective pairs of rollers during continued advance of the pair of protecting surfaces along the path under the applied mechanical roller pressure, individually releasing the mechanical roller pressure by respectively moving the pair of pressure rollers at each of such points from the operative engagement position to the non-engagement position upon corresponding advance therepast of the trailing portions of the pair of protective surfaces, and removing the discharge fat from the pressure rollers.

13. Apparatus for defatting animal pelts which comprises means defining a pair of substantially smooth protecting surfaces and together being advanceable along a path in substantially superimposed relation with the protecting surfaces inwardly facing each other, affixing means for removably stationarily situating an animal pelt to be defatted in covered relation between such inwardly facing protecting surfaces during advance along the path, coacting pressure rollers positioned operatively in the path, and conducting means for advancing in unison the pair of protecting surfaces in such superimposed relation and the affixing means along the path and into operative pressure engagement of the protecting surfaces with the rollers to squeeze and force gradually and incrementally the adhering fat from the pelt stationarily situatable by the affixing means between the pair of protecting surfaces.

14. Apparatus according to claim 13 wherein at least two corresponding longitudinally spaced apart pairs of coacting pressure rollers are positioned operatively in the path.

15. Apparatus according to claim 13 wherein the conducting means for advancing the pair of protecting surfaces includes traction means for advancing the pair of protecting surfaces under substantially constant selective positive forward pulling force along the path, and the coacting pressure rollers are provided with means for exerting substantially constant selective roller pressure.

16. Apparatus according to claim 13 for defatting animal pelts which comprises a pair of pelt retainers each having a substantially smooth protecting surface and together being advanceable along a path in substantially superimposed relation with the protecting surfaces inwardly facing each other, affixing means for removably stationarily situating an animal pelt to be defatted in covered relation between such inwardly facing protecting surfaces during advance along the path, coacting pressure rollers positioned operatively in the path, and conducting means for advancing in unison the pair of retainers in such superimposed relation and the affixing means along the path and into operative pressure engagement of such retainers with the rollers to squeeze and force gradually and incrementally the adhering fat from the pelt stationarily situatable by the affixing means between the pair of protecting surfaces.

17. Apparatus according to claim 16 wherein at least two corresponding longitudinally spaced apart pairs of coacting pressure rollers are positioned operatively in the path.

18. Apparatus according to claim 16 wherein the conducting means for advancing the pair of retainers includes traction means for advancing the pair of retainers under substantially constant selective positive forward pulling force along the path, and the coacting pressure rollers are provided with means for exerting substantially constant selective roller pressure.

19. Apparatus according to claim 16 wherein distribution means are operatively provided adjacent the path for selectively distributing fat-absorbing particulate material thereacross.

20. Apparatus according to claim 16 wherein the protecting surfaces are substantially fat-impervious and imperforate.

21. Apparatus according to claim 16 wherein the conducting means for advancing the pair of retainers includes traction means for advancing in unison the pair of retainers under substantially constant selective positive forward pulling force along the path, two corresponding longitudinally spaced apart pairs of superimposed upper and lower coacting pressure rollers are positioned operatively in the path, the upper roller of the first roller pair in the path is arranged as an idler roller and the remaining three rollers are arranged as driven rollers, roller driving means are provided for driving the three driven rollers at a selective peripheral rotational speed corresponding to the linear speed of advance of the pair of retainers via the traction means along the path, each upper roller of a roller pair is mounted for displacement into and out of operative engagement relation with the respective lower roller and is correspondingly provided with means for displacing the upper roller into and out of such operative engagement relation and for exerting substantially constant selective roller pressure against the respective lower roller when displaced into operative engagement relation therewith, and sensing means are provided for controlling the displacement of each such upper roller in accord with the position along the path of the corresponding portion of the pair of retainers at which the pelt is to be situated to displace each such upper roller into such operative engagement relation and to exert such roller pressure substantially only during the advancing of the corresponding pelt-situating portion of the pair of retainers therebetween.

22. Apparatus according to claim 21 wherein the pelt retainers of said pair are of selective corresponding length arranged in superimposed relation for advancing along a corresponding endless path and having their leading end portions fixed together and their trailing end portions freely disposed, the affixing means for removably stationarily situating the pelt are fixedly positioned between such leading end portions, and the traction means are operatively connected to such leading end portions to advance in unison the pelt retainers with the fixing means fixedly positioned therebetween along the corresponding endless path.

23. Apparatus according to claim 22 wherein the pelt retainers of said pair include an upper pelt retainer advanceable along a first endless path and having a selective length bounded between a leading and a trailing end portion with the corresponding protecting surface thereof disposed on the outer side thereof and a lower pelt retainer advanceable along a second endless path and having a selective length bounded between a leading and a trailing end portion with the corresponding protecting surface thereof disposed on the outer side of the second endless path, the affixing means for removably stationarily situating the pelt are fixedly disposed at the leading end portion of the lower pelt retainer on the outer side of the second endless path, and the traction means are respectively operatively connected to the leading and trailing end portions of the upper pelt retainer and to the leading end portion of the lower pelt retainer to advance in unison the upper pelt retainer and the lower pelt retainer with the affixing means fixedly positioned thereat along such paths and in opposing superimposed relation between the coacting rollers.

24. Apparatus according to claim 17 for defatting pelts which comprises a longitudinal platform having a top guiding surface provided with an elongated fat discharge opening therethrough, a pair of substantially parallel endless traction means mounted operatively on said platform for linear travel in unison along an endless path in laterally spaced apart relation, each such traction means having a forward traction section along the top guiding surface and a return traction section substantially along the underside of the platform, a plurality of pairs of corresponding superimposed upper and lower pelt retainers of selective corresponding length respectively having their leading end portions fixed together and their trailing end portions freely disposed, the retainers of each pair having a substantially smooth and slippery protecting surface inwardly facing each other, affixing means fixedly positioned at the leading end portions of each retainer pair for removably stationarily situating an animal pelt to be defatted in covered relation between the inwardly facing protecting surfaces of such retainers, the pairs of retainers being arranged in longitudinally spaced apart relation and across the lateral space between the pair of parallel traction means and connected at their corresponding leading end portions onto both such traction means for displacement in a forward direction along the top guiding surface and in a return direction substantially along the underside of the platform, a first pair of superimposed coacting pressure rollers including a fixed position lower driven roller and a displaceable upper idler roller, a second pair of superimposed coacting pressure rollers including a fixed position lower driven roller and a displaceable upper driven roller, the first and second pairs of rollers being arranged in longitudinally spaced apart ordinal relation operatively crosswise of the forward traction sections in the lateral space therebetween at such discharge opening with the lower rollers below and the upper rollers above substantially the level of the forward traction sections, individual linear displacement means operatively positioned for displacing respectively each of the upper rollers into and out of operative engagement relation with the corresponding lower roller and individual pressure exerting means for exerting pressure respectivey on each of the upper rollers when in operative engagement relation with the corresponding lower roller, a pair of longitudinally spaced apart retainer follower sensing members operatively positioned at selective points respectively beyond the corresponding first and second pairs of rollers in the path of the retainers along the forward traction sections for sensing sequentially the movement of the leading and trailing end portions of each pair of superimposed retainers therepast and for actuating respectively the individual linear displacement means to displace the corresponding upper roller into operative engagement relation position when the leading end portions of a pair of retainers is sensed and to displace such upper roller out of operative engagement relation position when the trailing end portions of such pair of retainers is sensed and for actuating said individual pressure exerting means to exert pressure on such corresponding roller when in such operative engagement relation position, a pair of upper roller sensing members operatively positioned respectively at selective points in the paths of displacement of the corresponding upper rollers remote from the position of operative engagement relation with the corresponding lower rollers for actuating respectively the individual pressure exerting means to arrest such pressure when the corresponding upper roller is out of operative engagement relation position, and conjoint traction and roller driving means for driving in unison such traction means along the path under substantially constant selective positive forward pulling force at a substantially constant selective linear speed and such driven rollers at a corresponding substantially constant peripheral rotational speed in any position of displacement of such upper rollers.

25. Apparatus according to claim 24 wherein the affixing means include a pair of operatively positioned eye hooks for engaging the corresponding eye holes of the animal pelt for removably stationarily situating such pelt in covered relation between the corresponding protecting surfaces of each retainer pair, and wherein the individual linear displacement means include corresponding individual pressure medium operable coacting piston-cylinder arrangements operatively connected respectively to such upper rollers, and the individual pressure exerting means include valve means operable for flowing pressure medium under constant pressure to a corresponding such piston-cylinder arrangement when the respective upper roller is displaced into operative engagement with the corresponding lower roller.

26. Apparatus according to claim 25 wherein a distributing hopper is operatively provided ahead of the first pair of coacting rollers adjacent the forward traction sections for selectively distributing fat-absorbing particulate material thereacross and onto the path of the pairs of retainers, wherein the protecting surfaces are substantially fat-impervious and imperforate, and wherein the lower rollers are provided with fat-scraper blades in operative wiping contact therewith.

* * * * *